(12) United States Patent
Kawano et al.

(10) Patent No.: US 11,173,834 B2
(45) Date of Patent: Nov. 16, 2021

(54) VEHICLE INTERIOR LIGHTING DEVICE (71) Applicant: TOYODA GOSEI CO., LTD., Kiyosu (JP)

(72) Inventors: Eiki Kawano, Kiyosu (JP); Kenjo Matsui, Kiyosu (JP)

(73) Assignee: TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 16/934,190

(22) Filed: Jul. 21, 2020

(65) Prior Publication Data

US 2021/0039551 A1   Feb. 11, 2021

(30) Foreign Application Priority Data

Aug. 5, 2019   (JP) ............................. JP2019-143736

(51) Int. Cl.
*B60Q 3/85*   (2017.01)
*B60Q 3/14*   (2017.01)
*B60Q 3/20*   (2017.01)

(52) U.S. Cl.
CPC ............... *B60Q 3/85* (2017.02); *B60Q 3/14* (2017.02); *B60Q 3/20* (2017.02)

(58) Field of Classification Search
CPC ... B60Q 3/85; B60Q 3/20; B60Q 3/14; B60Q 3/51; B60Q 3/74; B60Q 3/54; B60Q 2500/10; B60Q 3/64; F21V 5/048; F21V 17/164; F21V 9/30; F21Y 2115/10
See application file for complete search history.

(56) References Cited

U.S. PATENT DOCUMENTS

| 7,307,391 | B2 * | 12/2007 | Shan | ................. F21S 43/15 315/291 |
| 2007/0159854 | A1 * | 7/2007 | Kokubu | ................. F21V 7/04 362/634 |
| 2007/0170840 | A1 * | 7/2007 | Chang-Hae | ........... H01L 33/502 313/503 |
| 2019/0351821 | A1 * | 11/2019 | Badoil | ................. B60Q 3/208 |
| 2020/0309353 | A1 * | 10/2020 | Andersson | ............... H05K 5/00 |

FOREIGN PATENT DOCUMENTS

| FR | 2930918 | * | 6/2010 | ............ B60R 13/02 |
| JP | 6393558 B2 | | 9/2018 | |

OTHER PUBLICATIONS

English Translation of French 2930918, Jun. 2010, Godefroy et al. (Year: 2010).*

* cited by examiner

*Primary Examiner* — Peggy A Neils
(74) *Attorney, Agent, or Firm* — McGinn I.P. Law Group, PLLC.

(57) ABSTRACT

A vehicle interior lighting device includes a light-emitting portion, a case that includes a side wall surrounding the light-emitting portion and houses the light-emitting portion, and a plate-shaped lens fixed to the case so as to cover an opening of the case and an open end of the side wall defining the opening. Light emitted from the light-emitting portion can be extracted from the entire region of a light extraction surface of the lens including an edge without being reflected.

15 Claims, 6 Drawing Sheets

VEHICLE INTERIOR LIGHTING DEVICE

CROSS-REFERENCE TO RELATED APPLICATIONS

The present application is based on Japanese patent application No. 2019-143736 filed on Aug. 5, 2019, the entire contents of which are incorporated herein by reference.

TECHNICAL FILED

The invention relates to a vehicle interior lighting device.

BACKGROUND ART

A vehicle interior lighting device configured that light emitted from a light source such as LED (light-emitting diode) is extracted through a lens is known as a conventional vehicle interior lighting device (see, e.g., Patent Literature 1).

The vehicle interior lighting device described in Patent Literature 1 is provided with a substrate having LEDs on a surface on the vehicle interior side, a housing attached on the vehicle interior side relative to the substrate and having openings on a surface facing the substrate to allow insertion of the LEDs, and a lens provided on a surface of the housing on the opposite side to the substrate. When the vehicle interior lighting device is attached to an attachment portion such as roof liner, a flange portion of the lens overlaps a decorative surface of the attachment portion and this realizes a design in which only the lens is exposed.

CITATION LIST

Patent Literature

Patent Literature 1: Japanese patent No. 6393558

However, the vehicle interior lighting device of Patent Literature 1 has a structure in which the lens is fixed to the housing by fitting the housing on the inner side of plate-shaped ribs extending from the lens in a perpendicular direction and the flange portion of the lens greatly protrudes outward from the edge of the housing. Thus, light emitted from the LED cannot be directly extracted from the outer peripheral portion of the lens without being reflected and only light propagating inside the lens is extracted. As a result, there is a problem in that the outer peripheral portion of the lens is dark.

SUMMARY OF INVENTION

Technical Problem

It is an object of the invention to provide a vehicle interior lighting device that only a lens is exposed in a state of being attached to an attachment portion and a decrease in brightness at an outer peripheral portion of the lens is suppressed.

Solution to Problem

An aspect of the invention can provide a vehicle interior lighting device as defined in (1) to (9) below.

A vehicle interior lighting device, comprising: a light-emitting portion; a case that comprises a side wall surrounding the light-emitting portion and houses the light-emitting portion; and a plate-shaped lens fixed to the case so as to cover an opening of the case and an open end of the side wall defining the opening, wherein light emitted from the light-emitting portion can be extracted from the entire region of a light extraction surface of the lens including an edge without being reflected.

In one exemplary embodiment, the light comprises light that passes inside an inner edge of an end face of the open end.

In one exemplary embodiment, the lens comprises a rib that is provide on a surface opposite to the case and has a planar shape along a planar shape of the open end, and the lens is fixed to the case in the state that the rib is fitted into the open end of the side wall.

In one exemplary embodiment, the rib comprises a coupling portion for coupling the lens to the case.

In one exemplary embodiment, the coupling portions are provided at two positions that are located on portions of the rib extending along a longitudinal direction of the planar shape of the lens and sandwich the center of the lens.

In one exemplary embodiment, the lens and the case are coupled by snap-fitting, and the coupling portion comprises a protrusion of a snap-fit coupling structure.

In one exemplary embodiment, the case comprises a bottom portion that is integrated with the side wall and is continuous to an end portion of the side wall on the opposite side to the open end, the light-emitting portion is mounted on a printed circuit board housed in the case, and a terminal of the printed circuit board is bent so that an end portion of the terminal on the opposite side to a substrate of the printed circuit board is located at a distance from the bottom portion of the case.

In one exemplary embodiment, the substrate of the printed circuit board is white in color.

In one exemplary embodiment, the light-emitting portion comprises a light-emitting element, a sealing material for sealing the light-emitting element and a phosphor in the form of particles dispersed in the sealing material, and a concentration of the phosphor in the sealing material is not less than 20% mass.

Advantageous Effects of Invention

According to an embodiment of the invention, a vehicle interior lighting device can be provided that only a lens is exposed in a state of being attached to an attachment portion and a decrease in brightness at an outer peripheral portion of the lens is suppressed.

DESCRIPTION OF EMBODIMENTS

First Embodiment

Figure 1:
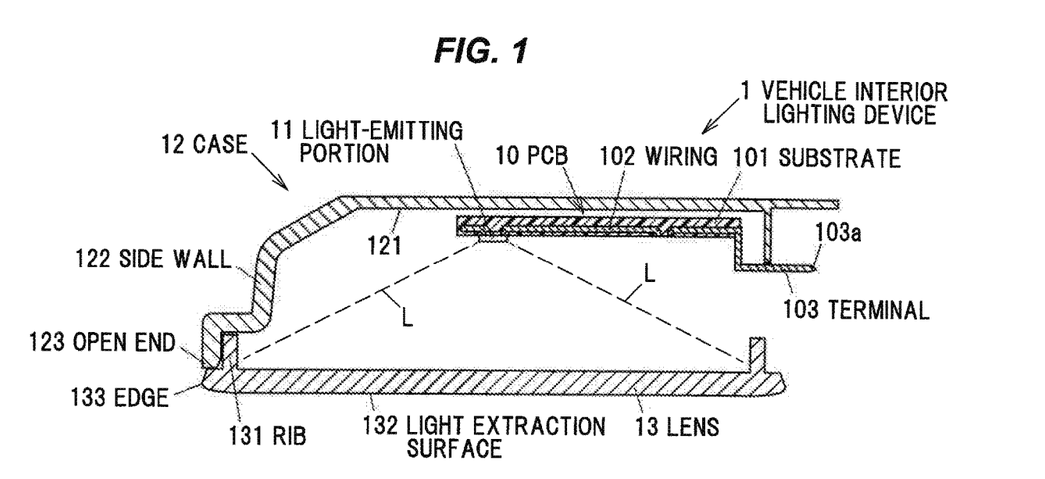
FIG. 1 is a vertical cross-sectional view showing a vehicle interior lighting device in the first embodiment of the present invention.

FIG. 1 is a vertical cross-sectional view showing a vehicle interior lighting device 1 in the first embodiment of the invention. The vehicle interior lighting device 1 is provided with a light-emitting portion 11, a case 12 for housing the light-emitting portion 11, and a plate-shaped lens 13 fixed to the case 12 so as to cover an opening of the case 12. Light emitted from the light-emitting portion 11 passes through the lens 13 and is then extracted from the vehicle interior lighting device 1.

The vehicle interior lighting device 1 is a lighting device which is installed on a ceiling of the vehicle interior and is, e.g., a vanity lamp, etc. Since the vehicle interior lighting device 1 is configured that the lens 13 is fixed to the case 12 so as to cover the opening of the case 12 and an open end 123 of a side wall 122 defining the opening, the side wall 122 of the case 12 does not protrude beyond the lens 13 when the vehicle interior lighting device 1 is seen, in planar view, from a light extraction surface 132 side of the lens 13. Thus, only the lens 13 is exposed when the vehicle interior lighting device 1 is fitted to an attachment opening on a ceiling panel in the vehicle interior.

The case 12 has the above-mentioned side wall 122 surrounding the light-emitting portion 11, and a bottom portion 121 which is integrated with the side wall 122 and is continuous to an end portion of the side wall 122 on the opposite side to the open end 123. Th case 12 has a property of being impenetrable to light emitted from the light-emitting portion 11. The case 12 is preferably a highly reflective white member so that light extraction efficiency of the vehicle interior lighting device 1 is improved.

The material of the case 12 is, e.g., PBT (polybutylene terephthalate), nylon, PC (polycarbonate) or PC+ABS. Since the case 12 has a connector insertion portion 120, it is preferable to use a material providing excellent dimensional accuracy and having excellent material strength. PP is also preferable as a material of the case 12 since it has a high toughness and thus allows the case 12 to be easily attached to an attachment target member.

FIGS. 2A, 2B, 2C and 2D show the lens 13 and are respectively a top view, a bottom view, a side view when viewed in a lateral direction of the planar shape, and a side view when viewed in a longitudinal direction of the planar shape. The lens 13 has a rib 131 on a surface opposite to the case 12. It is possible to improve strength or rigidity of the lens 13 by providing the rib 131.

The rib 131 has a planar shape which is along the planar shape (annular shape) of the open end 123 of the side wall 122 and is typically an annular shape, and the lens 13 is fixed to the case 12 in the state that the rib 131 is fitted into or around the open end 123.

The rib 131 has coupling portions 134 for coupling and fixing the lens 13 to the case 12. When the lens 13 is coupled to the case 12 by, e.g., snap-fitting, the coupling portion 134 is a claw of a snap-fit coupling structure or is a hole or groove to which a claw is fitted. Typically, the coupling portions 134 are provided at two positions which are located on portions of the rib 131 extending along the longitudinal direction of the planar shape of the lens 13 and sandwich the center of the lens 13, or at two positions which are located on portions of the rib 131 extending along the lateral direction of the planar shape of the lens 13 and sandwich the center of the lens 13.

Figure 2A:
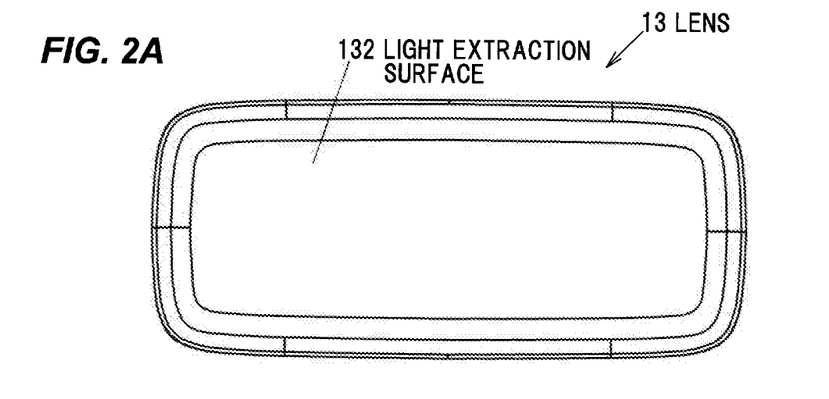
FIGS. 2A, 2B, 2C and 2D show a lens and are respectively a top view, a bottom view, a side view when viewed in a lateral direction of the planar shape, and a side view when viewed in a longitudinal direction of the planar shape.
Figure 2B:
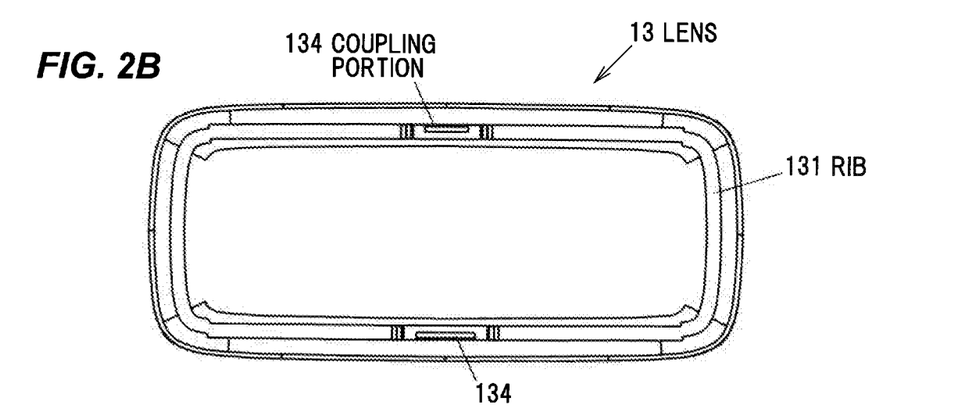
Figure 2C:
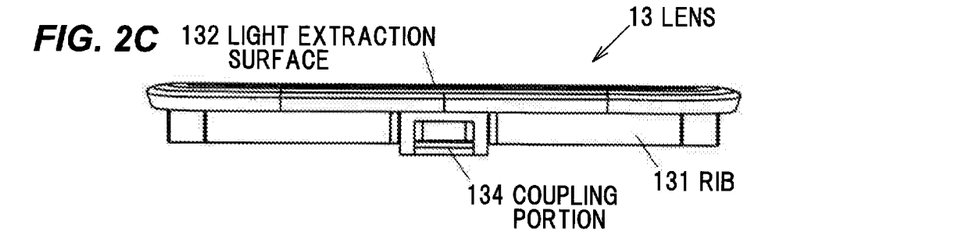
Figure 2D:
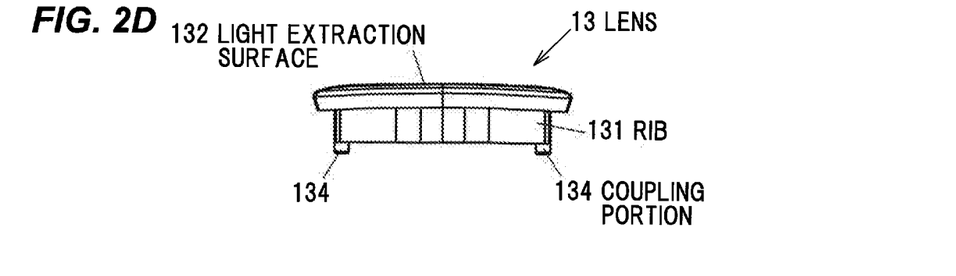

Light incident on the portions of the rib 131 provided with the coupling portions 134 is less likely to pass through to the opposite side since such portions have a complicated shape as compared to the portions without the coupling portions 134. For this reason, to reduce the impact of the coupling portion 134 on brightness uniformity of the light extraction surface 132, it is preferable that the coupling portions 134 be provided at two positions which are close to the light-emitting portion 11 as a light source, are located on the portions of the rib 131 extending along the longitudinal direction of the planar shape of the lens 13 and sandwich the center of the lens 13, as shown in FIGS. 2B and 2C.

Figure 3A:
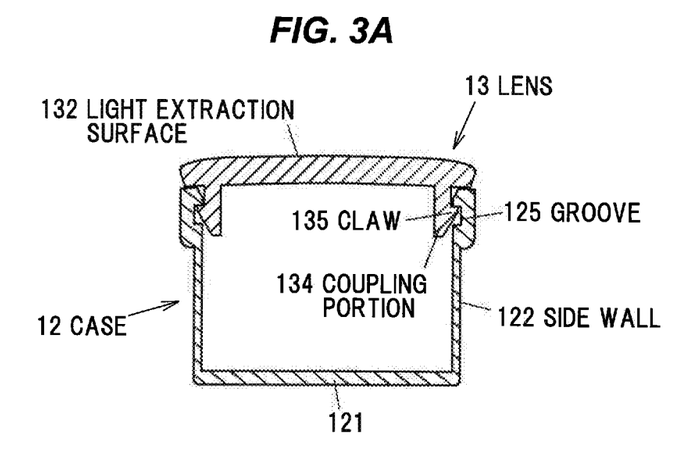
FIG. 3A is a vertical cross-sectional view showing the vehicle interior lighting device including coupling portions of the lens.
Figure 3B:
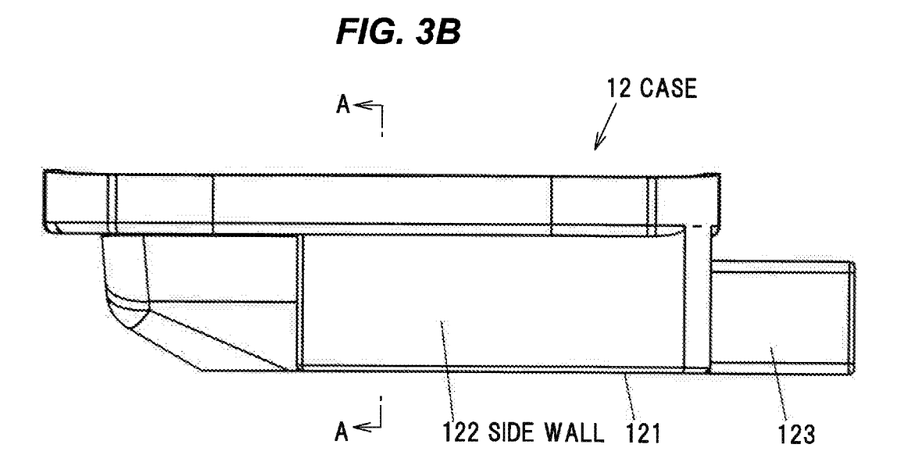
FIG. 3B is a side view showing a case.

FIG. 3A is a vertical cross-sectional view showing the vehicle interior lighting device 1 including the coupling portions 134 of the lens 13. The position at which the cross section shown in FIG. 3A is taken corresponds to the position of the section line A-A shown in the side view of the case 2 in FIG. 3B. In the example shown in FIG. 3A, each coupling portion 134 of the lens 13 has a claw 135 of the snap-fit coupling structure, and grooves 125 corresponding to the claws 135 of the coupling portions 134 are provided on an inner surface of the side wall 122 of the case 12. The claw is preferably provided on the coupling portion 134 of the lens, not on the side wall 122 of the case 12, as shown in FIG. 3A, to prevent a portion of the case 12 to be a light blocking object from protruding inside the side wall 122.

The lens 13 is formed of a transparent material such a PC (polycarbonate), PMMA (polymethylmethacrylate). The light extraction surface 132 of the lens 13 is preferably finely textured by surface texturing to improve brightness uniformity of the light extraction surface 132. The method of finely texturing the light extraction surface 132 is, e.g., a method in which the lens 13 is injection-molded using a mold having a textured portion at a corresponding position on the inner surface, or a method in which the light extraction surface 132 of the molded lens 13 is subjected to a blasting process. The lens 13 may contain a diffusing agent to improve brightness uniformity of the light extraction surface 132.

Figure 4:
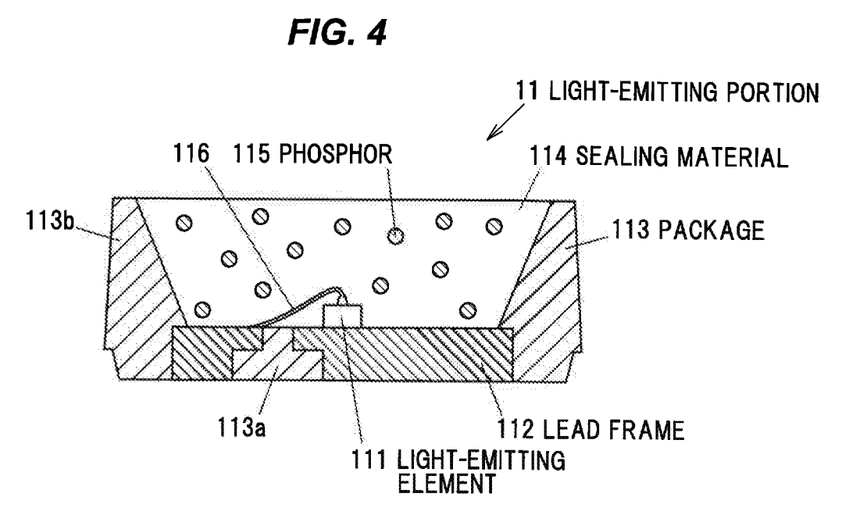
FIG. 4 is a vertical cross-sectional view showing an example configuration of a light-emitting portion.

FIG. 4 is a vertical cross-sectional view showing an example configuration of the light-emitting portion 11. The light-emitting portion 11 is provided with a light-emitting element 111 such as LED, a lead frame 112 mounting the light-emitting element 111, a package 113 which has a bottom portion 113a with the lead frame 112 embedded therein and a side wall 113b surrounding the light-emitting element 111, a sealing material 114 filling the inside of the package 113 and sealing the light-emitting element 111, and a phosphor 115 in the form of particles dispersed in the sealing material 114. The color temperature of the light emitted from the light-emitting portion 11 is, e.g., 2,800 to 4,500K.

In the example shown in FIG. 4, the light-emitting element 111 is a vertical light-emitting element and is arranged such that an electrode on the upper portion thereof is connected to one of electrodes of the lead frame 112 via a bonding wire 116 and an electrode on the lower portion is directly connected to the other electrode of the lead frame 112.

To improve brightness uniformity of the light extraction surface 132 of the lens 13, the light-emitting element 111 preferably has wide light distribution characteristics. It is preferable that, e.g., 1/2θ (a light distribution angle θ at which intensity is half the peak intensity) be not less than 60°. The light distribution angle θ here is an angle relative to an axial direction of the light-emitting element 111 (the upward direction in FIG. 4) and within a plane which includes the axial direction and is perpendicular to the surface of the lead frame 112.

For example, the entire portion, or the surface, of the lead frame 112 is formed of a conductive material such as Ag, Cu, Al.

The package 113 is formed of, e.g., a thermoplastic resin such as polyphthalamide resin, LCP (liquid crystal polymer), PCT (polycyclohexylene dimethylate terephthalate), or a thermosetting resin such as silicone resin, modified silicone resin, epoxy resin, modified epoxy resin, and is formed by injection molding or transfer molding. The package 113 may contain light reflecting particles formed of titanium dioxide, etc., to improve light reflectivity.

The sealing material 114 is formed of, e.g., a resin material such as silicone-based resin or epoxy-based resin.

The phosphor 115 is a phosphor which is excited by light emitted from the light-emitting element 111 and produces fluorescence. The phosphor 115 has a D50 particle size of, e.g., about 20 μm.

To enhance the color rendering properties of the light emitted from the light-emitting portion 11, the phosphor 115 is preferably formed of plural types of phosphors. When emission color of the light-emitting element 111 is, e.g., blue, the phosphor 115 is formed of a YAG (yttrium aluminum garnet) phosphor as a yellow phosphor and a $CaAlSiN_3$:Eu phosphor as a red phosphor. Alternatively, a LuAG (lutetium aluminum garnet) phosphor may be used in place of the YAG phosphor.

By using plural types of phosphors as the phosphor 115 and thereby enhancing the color rendering properties of the light emitted from the light-emitting portion 11, it is possible to reduce glaring (dazzling) of light extracted from the vehicle interior lighting device 1.

By using plural types of phosphors as the phosphor 115, the concentration of the phosphor 115 in the sealing material 114 is increased and the amount of diffuse reflection of the light emitted from the light-emitting element 111 in the sealing material 114 is increased. As a result, the light-emitting portion 11 has wide light distribution and brightness uniformity of the light extraction surface 132 of the lens 13 is improved. To effectively widen the light distribution from the light-emitting element 111, it is preferable that the concentration of the phosphor 115 in the sealing material 114 be not less than 20 mass %, i.e., a ratio of the mass of the phosphor 115 with respect to the total mass of the sealing material 114 and the phosphor 115 have a value of not less than 0.2.

The package configuration of the light-emitting portion 11 and the structure type (vertical, lateral, face-up, face-down, etc.) and mounting method (wire bonding, flip-chip, etc.) of the light-emitting element 111 are not limited to those shown in FIG. 4.

The light-emitting portion 11 is mounted on, e.g., a PCB (printed circuit board) 10 housed in the case 12, as shown in FIG. 1. The PCB 10 is provided with a substrate 101, a wiring 102 provided on a surface of or inside the substrate 101 and connected to an electrode of the light-emitting portion 11, and a terminal 103 connected to the wiring 102 on the substrate 101 by the reflow method.

The connection structure between the terminal 103 and a connector connected thereto is determined by the standard, and an end portion 103a of the terminal 103, which is an end portion on the opposite side to the substrate 101, should be located at a distance from the bottom portion 121 of the case 12 in the height diction (in the vertical direction of FIG. 1). For this reason, the terminal 103 is bent so that the end portion 103a is located at a distance from the bottom portion 121 of the case 12 as shown in FIG. 1, thereby allowing the substrate 101 to be arranged close to the bottom portion 121 of the case 12 without changing the height of the end portion 103a. Thus, the distance between the light-emitting portion 11 and the lens 13 is increased and brightness uniformity of the light extraction surface 132 can be improved.

In the vehicle interior lighting device 1, the substrate 101 of the PCB 10 is exposed inside the case 12 and light reflected at the lens 13, etc., hits the substrate 101. Therefore, the substrate 101 of the PCB 10 is preferably white in color to increase reflectivity. By increasing the reflectivity of the substrate 101, it is possible to improve light extraction efficiency of the vehicle interior lighting device 1. The white substrate 101 is formed of, e.g., a natural-colored BPS resin without containing added carbon, etc.

Figure 5:
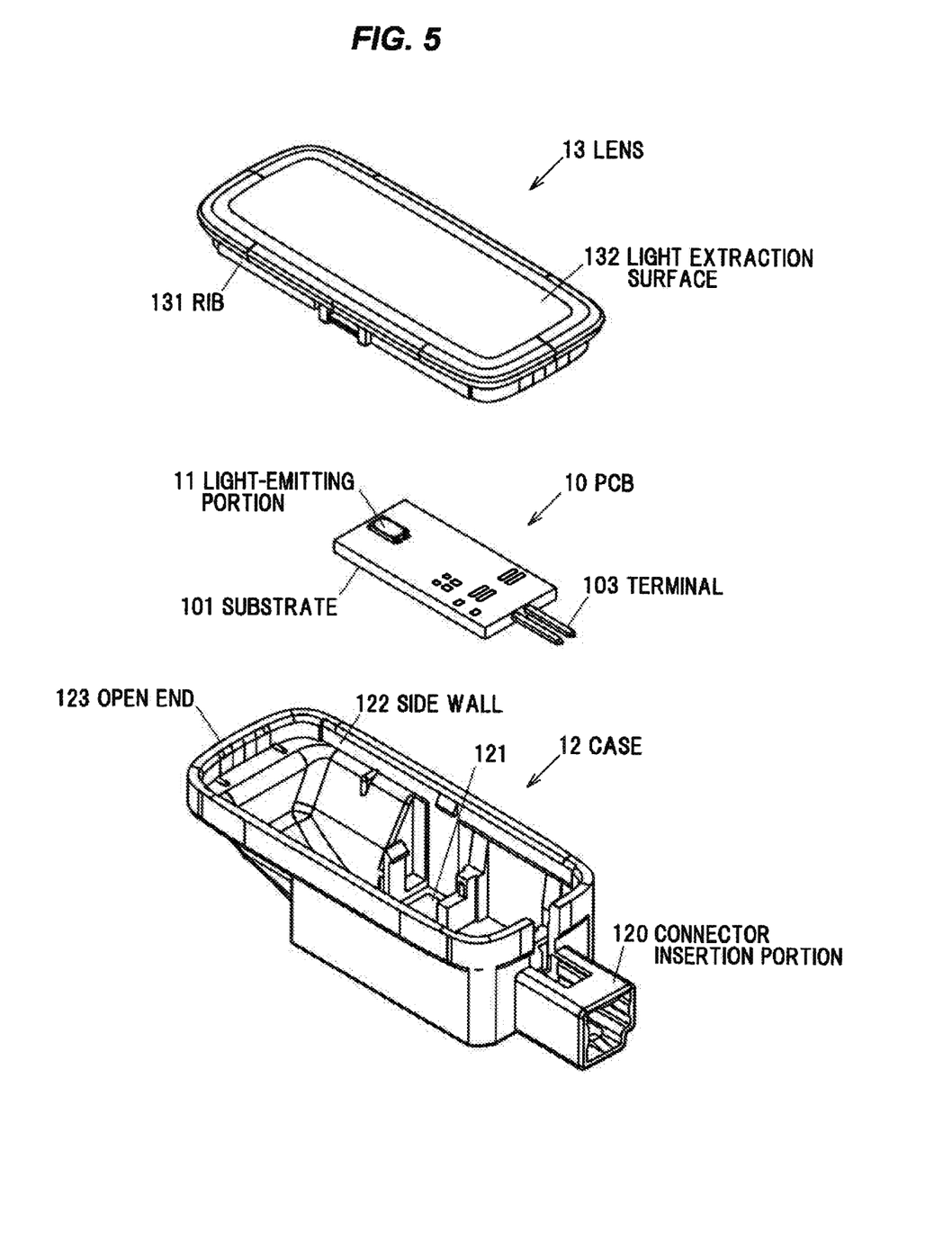
FIG. 5 is an exploded perspective view showing the vehicle interior lighting device in the first embodiment of the invention.

FIG. 5 is an exploded perspective view showing the vehicle interior lighting device 1. As shown in FIG. 5, a direction of attaching the PCB 10 to the case 12 and a direction of attaching the lens 13 to the case 12 are the same and it is thus possible to easily assemble the vehicle interior lighting device 1.

In addition, as shown in FIG. 5, the bottom portion 121 of the case 12 does not have any hole for attaching other members. Therefore, when the vehicle interior lighting device 1 is installed on a ceiling of the vehicle interior so that the lens 13 faces downward, there is a low risk that water or dust gets in the case 12.

In case that the light-emitting element 111 has a rectangular planar shape, it is possible to increase the amount of light reaching the longitudinal ends of the lens 13 and improve brightness uniformity of the light extraction surface 132 by arranging the light-emitting element 111 so that the longitudinal direction of the planar shape thereof coincides with the longitudinal direction of the planar shape of the case 12.

(Brightness Uniformity of Light Extraction Surface)

In the vehicle interior lighting device 1, the light emitted from the light-emitting portion 11 can be extracted from the entire region of the light extraction surface 132 of the lens 13 including an edge 133 without being reflected. Thus, a decrease in brightness in the vicinity of an outer peripheral portion of the light extraction surface 132 of the lens 13 is suppressed and brightness uniformity of the light extraction surface 132 is enhanced.

In a typical configuration of the vehicle interior lighting device 1, the open end 123 of the side wall 122 of the case 12 acts as an aperture stop which limits a radiation range of light extracted from the vehicle interior lighting device 1. Hereinafter, an inner edge of the end face of the open end 123, which corresponds to an edge of an aperture, is called an "aperture-stop edge 124".

Figure 6A:
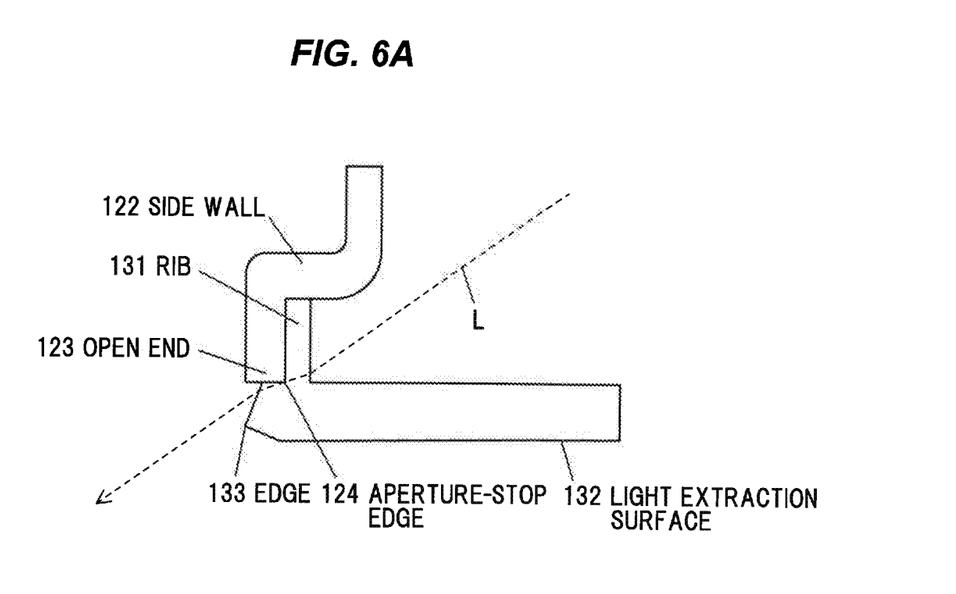
FIG. 6A is a vertical cross-sectional view showing the vicinity of an outer peripheral portion of the lens of the vehicle interior lighting device in the first embodiment of the invention.

FIG. 6A is a vertical cross-sectional view showing the vicinity of the outer peripheral portion of the lens 13 of the vehicle interior lighting device 1. A light path L indicated by a dotted line shows a path of light which is emitted from the light-emitting portion 11, passes by the aperture-stop edge 124, and is extracted from the vehicle interior lighting device 1, without being reflected (but refracted at an interface between air and the lens 13), i.e., the light path L is the outermost path of light extracted from the vehicle interior lighting device 1 without being reflected.

As shown in FIG. 6A, the light path L passes outside the edge 133 of the light extraction surface 132. This shows that the light emitted from the light-emitting portion 11 can reach the entire region of the light extraction surface 132 of the lens 13 including the edge 133 without being reflected. As shown in FIG. 6A, when the open end 123 of the side wall 122 acts as an aperture stop, the light emitted from the light-emitting portion 11 and passing inside the aperture-stop edge 124 (the inner edge of the end face of the open end 123) can reach the entire region of the light extraction surface 132 of the lens 13 including the edge 133 without being reflected.

In the example shown in FIG. 6A, the lens 13 is fixed to the case 12 in the state that the rib 131 of the lens 13 is fitted into the open end 123 of the side wall 122.

Figure 6B:
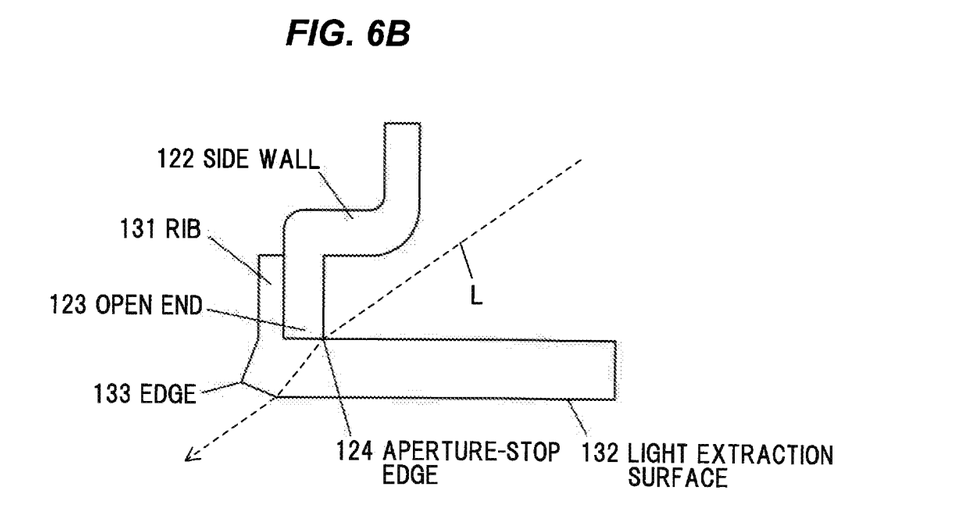
FIG. 6B is a vertical cross-sectional view showing the vicinity of an outer peripheral portion of the lens of the vehicle interior lighting device in Comparative Example.

FIG. 6B shows an example of a structure of the vehicle interior lighting device 1 when the lens 13 is fixed to the case 12 in the state that the rib 131 is fitted around the open end 123 of the side wall 122.

In the example shown in FIG. 6B, the light path L passes inside the edge 133 of the light extraction surface 132. Therefore, the light emitted from the light-emitting portion 11 and extracted from the vehicle interior lighting device 1 without being reflected does not pass in the vicinity of the edge 133 of the light extraction surface 132 and brightness at the outer peripheral portion of the light extraction surface 132 thus decreases.

As shown in FIGS. 6A and 6B, the position of the aperture-stop edge 124 is farther from the edge 133 of the light extraction surface 132 when the rib 131 is located outside the open end 123 than when located inside. Therefore, in case of the structure in which the rib 131 of the lens 13 is fitted around the open end 123 of the side wall 122, the positional relation between the edge 133 of the light extraction surface 132 and the light path L can be adjusted to some extent by changing the shape, etc., of the lens 13, but it is relatively difficult for the light emitted from the light-emitting portion 11 to reach the entire region of the light extraction surface 132 of the lens 13 including the edge 133 without being reflected.

Therefore, the lens 13 is preferably fixed to the case 12 in the state that the rib 131 is fitted into the open end 123 of the side wall 122 so that the light emitted from the light-emitting portion 11 can reach the entire region of the light extraction surface 132 of the lens 13 including the edge 133 without being reflected.

(Effects of the Embodiment)

In the vehicle interior lighting device 1 in the embodiment of the invention, the light emitted from the light-emitting portion 11 can reach the entire region of the light extraction surface 132 of the lens 13 including the edge 133 without being reflected. Therefore, a decrease in brightness in the vicinity of the outer peripheral portion of the light extraction surface 132 of the lens 13 is suppressed and brightness uniformity of the light extraction surface 132 is thereby enhanced.

Although the embodiment of the invention has been described, the invention is not intended to be limited to the embodiment, and the various kinds of modifications can be implemented without departing from the gist of the invention. In addition, the constituent elements in the embodiment can be arbitrarily combined without departing from the gist of the invention.

In addition, the invention according to claims is not to be limited to the embodiment. Further, please note that all combinations of the features described in the embodiment are not necessary to solve the problem of the invention.

The invention claimed is:

1. A vehicle interior lighting device, comprising:
   a light-emitting portion;
   a case that comprises a side wall surrounding the light-emitting portion and houses the light-emitting portion; and
   a plate-shaped lens fixed to the case so as to cover an opening of the case and an open end of the side wall defining the opening,
   wherein light emitted from the light-emitting portion is extracted from the entire region of a light extraction surface of the plate-shaped lens including an edge without being reflected,
   wherein the edge of the plate-shaped lens is positioned to create a space between a point of the edge of the plate-shaped lens and the outmost edge of the case, and
   wherein the edge of the plate-shaped lens is configured such that the light emitted from the light-emitting portion passes outside the edge of the plate-shaped lens and passes through the space.

2. The vehicle interior lighting device according to claim 1, wherein the light comprises light that passes inside an inner edge of an end face of the open end.

3. The vehicle interior lighting device according to claim 1, wherein the plate-shaped lens comprises a rib that is provided on a surface opposite to the case and has a planar shape along a planar shape of the open end, and the plate-shaped lens is fixed to the case in the state that the rib is fitted into the open end of the side wall.

4. The vehicle interior lighting device according to claim 3, wherein the rib comprises a coupling portion for coupling the plate-shaped lens to the case.

5. The vehicle interior lighting device according to claim 4, the coupling portions are provided at two positions that are located on portions of the rib extending along a longitudinal direction of the planar shape of the plate-shaped lens and sandwich the center of the plate-shaped lens.

6. The vehicle interior lighting device according to claim 4, wherein the plate-shaped lens and the case are coupled by snap-fitting, and the coupling portion comprises a protrusion of a snap-fit coupling structure.

7. The vehicle interior lighting device according to claim 1, wherein the case comprises a bottom portion that is integrated with the side wall and is continuous to an end portion of the side wall on the opposite side to the open end, the light-emitting portion is mounted on a printed circuit board housed in the case, and a terminal of the printed circuit board is bent so that an end portion of the terminal on the opposite side to a substrate of the printed circuit board is located at a distance from the bottom portion of the case.

8. The vehicle interior lighting device according to claim 7, wherein the substrate of the printed circuit board is white in color.

9. The vehicle interior lighting device according to claim 1, wherein the light-emitting portion comprises a light-emitting element, a sealing material for sealing the light-emitting element and a phosphor in the form of particles dispersed in the sealing material, and a concentration of the phosphor in the sealing material is not less than 20% mass.

10. The vehicle interior lighting device according to claim 1, wherein the side wall of the case does not protrude beyond the plate-shaped lens when viewed, in a planar view, from the light extraction surface side of the plate-shaped lens.

11. The vehicle interior lighting device according to claim 1, wherein the open end of the side wall is configured as an aperture stop.

12. The vehicle interior lighting device according to claim 1, wherein the edge of the plate-shaped lens is co-planar to an outmost edge of the case.

13. The vehicle interior lighting device according to claim 1, wherein the point of the edge of the plate-shaped lens is positioned closer to the opening than the light extraction surface of the plate-shaped lens.

14. The vehicle interior lighting device according to claim 1, wherein the point of the edge of the plate-shaped lens is positioned closer to the light-emitting portion than the light extraction surface of the plate-shaped lens.

15. The vehicle interior lighting device according to claim 1, wherein the light emitted from the light-emitting portion passes outside the edge of the plate-shaped lens as the light passes through a plane that is co-planar to a surface of the light extraction surface.

* * * * *